Nov. 18, 1969  F. S. MORSHAUSER ET AL  3,479,429
MULTI-COLORED COSMETIC PREPARATION
Original Filed Jan. 26, 1965  3 Sheets-Sheet 1
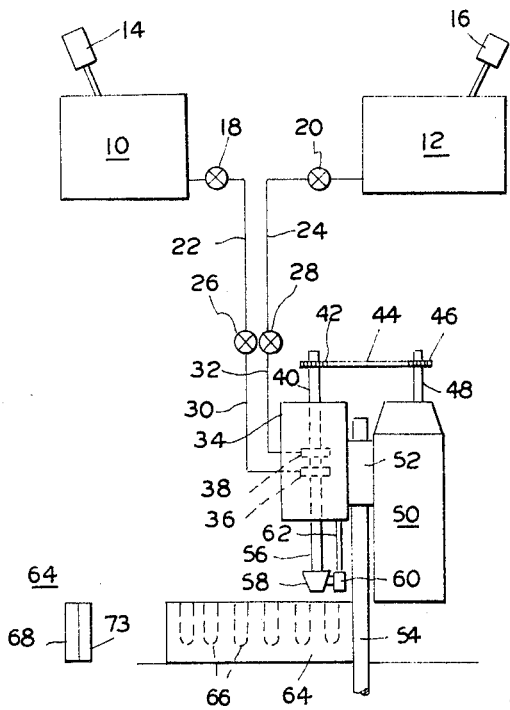
FIG.2  FIG.1
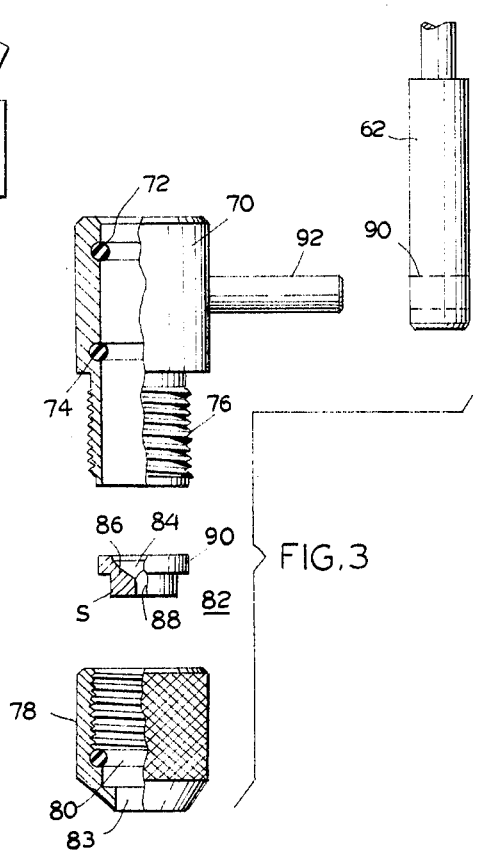
FIG.3
FIG.4
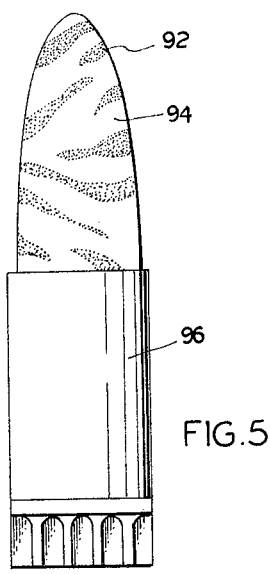
FIG.5
INVENTORS
FRED S. MORSHAUSER
SAMUEL KALISH
ALFRED R. BIAMONTE
ALBERT L. BORSTLAP
ALBERT C. WEBER, JR.
BY *Albert H. Graddis*
ATTORNEY

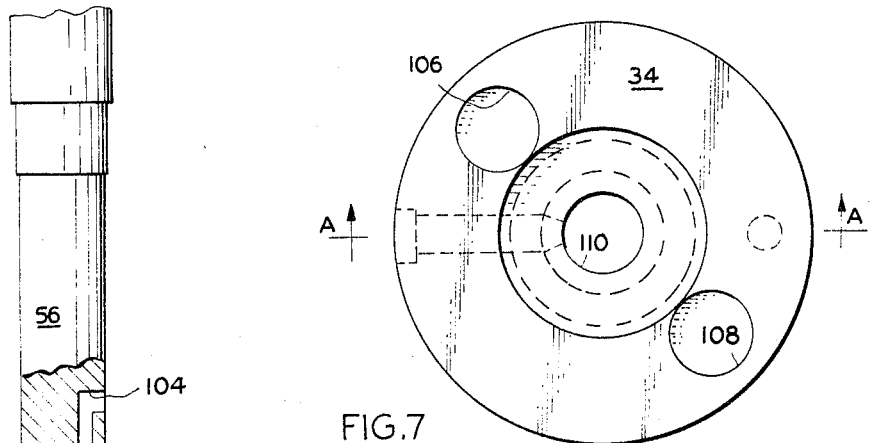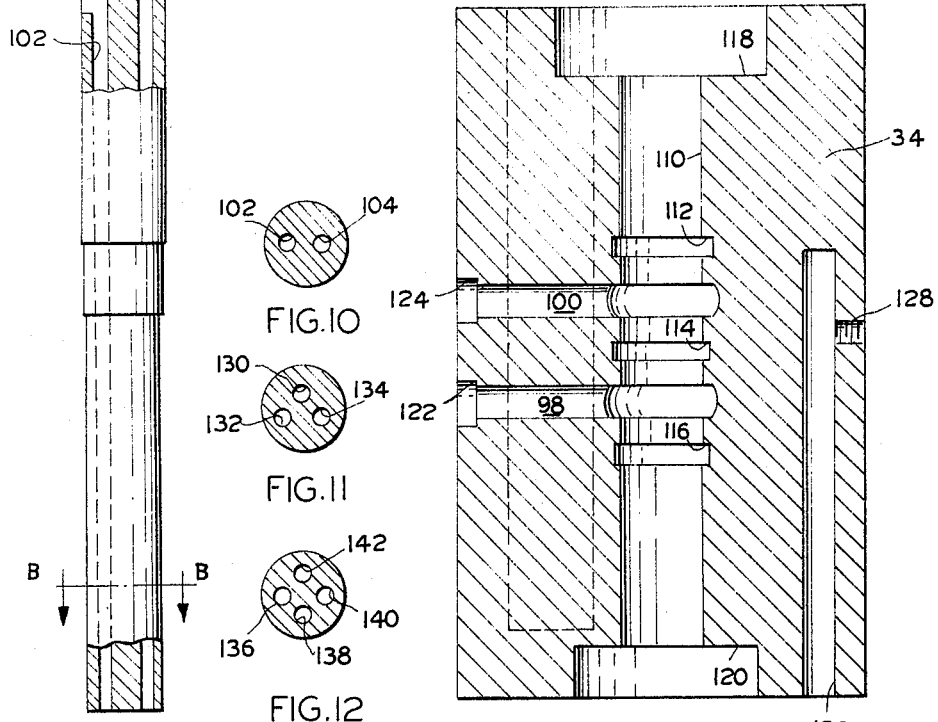

United States Patent Office 3,479,429
Patented Nov. 18, 1969

3,479,429
MULTI-COLORED COSMETIC PREPARATION
Fred S. Morshauser, Pompton Plains, N.J., Samuel Kalish, New York, N.Y., Alfred R. Biamonte, Westfield, N.J., and Albert L. Borstlap and Albert C. Weber, Jr., Lancaster, Pa., assignors to Warner-Lambert Pharmaceutical Company, Morris Plains, N.J., a corporation of Delaware
Original application Jan. 26, 1965, Ser. No. 428,172, now Patent No. 3,228,662, dated Jan. 11, 1966. Divided and this application Oct. 7, 1965, Ser. No. 493,730
Int. Cl. A61k 7/00
U.S. Cl. 424—63    5 Claims

ABSTRACT OF THE DISCLOSURE

The present invention describes a method for preparing multi-colored cosmetic preparations wherein differently colored masses are heterogeneously associated in the form of a unitary product. This method comprises adding a multiple number of colored agents to multiple portions of a suitable base formulation separately transporting the base formulation in molten form to corresponding channels within a rotating shaft and then mixing the transported base formulation in a stationary chamber and thereafter allowing the combined molten color base to congeal into a solid mass.

---

The present invention for United States Letters Patent is a divisional application of copending U.S. patent application Ser. No. 428,172, filed Jan. 26, 1965 now U.S. Patent No. 3,228,662 issued Jan. 11, 1966.

This invention relates to apparatus useful for preparing multi-colored preparations wherein differently colored masses are heterogeneously associated in the form of a unitary product having a multi-colored, variegated pattern.

Preparation of two or more differently colored products such as, for example, lipsticks, to produce a two-tone or multi-colored effect on the lips is a well-known practice. In such instances, to achieve the desired blending effect, one color is usually applied to the lips as a base and the other color or colors superimposed thereon for contrast. The desired final effect is then achieved by blending the superimposed colors while on the lips.

Heretofore, attempts have been made to produce a unitary lipstick having a plurality of colors by assembling several individual segments in side-by-side relationship and thereafter pressing the segments together to form a unitary lipstick mass. Such lipsticks, however, have met with limited commercial success and one reason may be that these lipsticks have been more difficult and expensive to produce than conventional one-color lipsticks. In practice, of course, lipsticks which are formed by molding segments of different colors into a single multi-colored tube are usually applied to the lips by using the single color of each segment such that these lipsticks merely offer the convenience of two separate colors in one unitary mass.

It has now been found that products comprising a heterogeneous color blend may be commercially prepared by the novel apparatus of the present invention which provides means for a plurality of differently colored masses to form into a unitary multi-colored product having several colors heterogeneously associated in the color combinations employed. A plurality of separately colored bases may be thus heterogeneously combined without requiring excessive production control measures in a process wherein duplication results with reasonable accuracy in the formation of a novel marbleization effect.

It is, therefore, an object of this invention to provide apparatus for preparing multi-colored preparations more efficiently and economically than heretofore considered possible.

It is also an object of this invention to provide apparatus useful for preparing multi-colored preparations such that the heterogeneous association of colors is substantially complete prior to molding the mass into any convenient shape.

It is a further object of this invention to provide apparatus useful for commercially preparing multi-colored cosmetic preparations wherein at least two differently colored cosmetic masses are combined to form distinctive heterogeneous color effects appearing as a marbleization blend.

It is also a specific object of this invention to provide apparatus useful for commercially preparing multi-colored eye shadow sticks and lipsticks wherein at least two differently colored base masses are combined to form distinctive heterogeneous color effects appearing as a marbleization blend.

These and other objects will become more apparent from the following detailed description taken with regard to the accompanying drawings in which like numerals represent the same elements throughout the several views.

FIG. 1 represents a diagrammatic view showing the several elements of the present invention as they may appear in combination;

FIG. 2 is a side view showing the split mold of FIG. 1;

Figure 6:
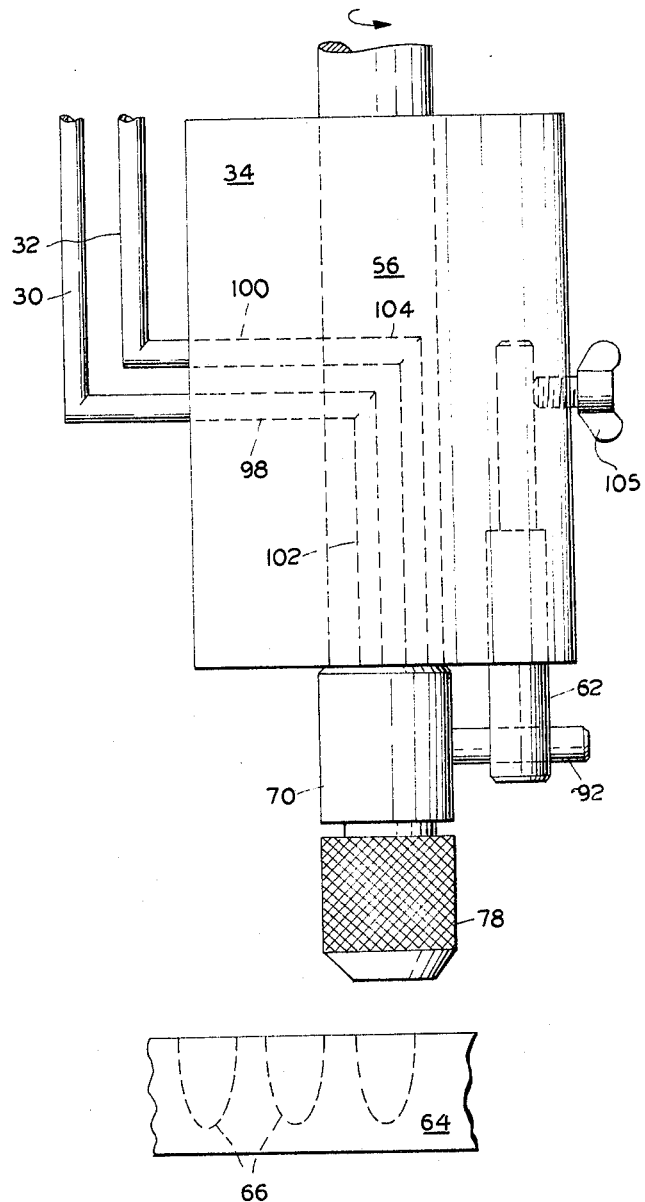

FIG. 3 indicates, in a space relationship, the several elements forming the filling and pouring-head attachment of the present apparatus;

FIG. 4 is a top view of stator element S of FIG. 3;

FIG. 5 is an elevational view indicating the appearance of the cosmetic product formed by the apparatus of the present invention;

FIG. 6 shows the combination of elements comprising a processing unit wherein the colored masses are transported and heterogeneously combined;

FIG. 7 is a top view of the central rotor-shaft chamber appearing with the several associated elements removed therefrom;

FIG. 8 is a side elevational view taken along section lines A—A of FIG. 7;

FIG. 9 is an elevational view of the rotor-shaft used in the chamber of FIG. 8;

FIG. 10 is a sectional view taken along section lines B—B of FIG. 9;

FIG. 11 is a similar view to FIG. 10 illustrating a three-hole embodiment of the rotor-shaft;

FIG. 12 is a further view similar to FIG. 10 illustrating a four-hole embodiment of the rotor-shaft.

Referring to FIG. 1 of the drawing, color tanks 10 and 12 are shown with variable speed mixers 14 and 16 for mixing molten color masses within the color tanks to prevent premature color settling and for promoting uniformity in the molten viscosity to the masses. The tanks may be heated by any suitable means such as electrical resistance or induction heating, steam heating or the like to maintain the masses in a uniform and molten state. Color tanks 10 and 12, therefore, serve to standardize the temperature and viscosity of the masses being processed. Although only two tanks are indicated in FIG. 1, it is recognized that any additional number of color tanks may be employed, all of which will contain distinctively different colors which are desired to be blended according to this invention into a heterogeneous association of multi-colors.

Color tanks 10 and 12 are provided with control valves 18 and 20, respectively, to regulate the flow of the molten masses to a wait-pour section of the process scheme indicated as lines 22 and 24 which may be further controlled by valves 26 and 28. Control valves 26 and 28 regulate, at any desired rate, the flow of molten masses to lines 30 and 32, respectively, which transport the molten masses into central rotor-shaft chamber 34 provided with annular supply ports 36 and 38 disposed about rotor 40. Near one end of rotor 40 there is provided suitable gear 42, powered by belt 44 driven by further gear 46 appearing on shaft 48 of motor 50. It is recognized that any suitable drive mechanism may be employed to rotate shaft 40 without departing from this invention. Motor 50 and central rotor-shaft chamber 34 may be both conveniently supported by brace 52 appearing on support pole 54. The rotor may be rotated at any desirable speed such as from about 1 r.p.m. to about 400 r.p.m.

The opposite end of rotor 40 indicated as shaft 56 is provided with filling and pouring head 58 which is firmly held to shaft 56 by brace 60. Brace 60 is secured to support rod 62 indicated in fixed position to the bottom of central rotor shaft chamber 34.

FIGS. 1 and 2 further illustrate split mold 64 having receiving forms 66 therein. The mold is desirably a split mold formed by half-sections 68 and 73 to facilitate removal of the molded masses upon solidification.

FIG. 3 indicates in greater detail the several elements forming filling and pouring head 58 of FIG. 1. The elements of head 58 include slip-shell 70 containing O-rings 72 and 74 for securing the slip-shell on shaft 56, and threads 76 for receiving stator securing lug 78 containing O-ring 80 therein to prevent leakage of the molten cosmetic masses around stator 82 fitted within stator securing lug 78. Stator 82 is provided with bowl 84 having cut-outs 86 therein which function primarily as the blending elements of the filling-head from which heterogeneously blended colors pass through exit port 88. Stator 82 is designed to fit in close connection in seat 83 of stator securing lug 78 when the securing lug is in place on threads 76. The slip-shell 70 may be secured on shaft 56 by securing rod 62 having cut-out 90 designed to receive brace 92 attached to slip-shell 70. Although other more permanent means may be employed to secure brace 92 to support rod 62, the indicated means is found desirable for ease of dismantling the several elements forming head 58, for cleaning and maintenance purposes.

FIG. 4 shows stator 82 as it appears from the top view indicating more clearly bowl 84 and cut-outs 86 appearing in relation to port 88 centrally disposed therein. Although four cut-outs are indicated within bowl 84, it is recognized that a greater degree of mixing may be obtained by including additional cut-outs and a lesser degree of mixing may be obtained by eliminating some or all of the cut-outs. Annular rim 90 of stator 82 functions to secure the stator within seat 83 of stator securing lug 78.

FIG. 5 indicates a lipstick formed by the apparatus of the present invention showing the more dominant dark color appearing as color 92 with a second color appearing as color 94. The lipstick is indicated with suitable case 96 of the type known to the art.

Referring to FIG. 6, lines 30 and 32 are depicted entering the central rotor-shaft chamber 34 through lateral transport lines 98 and 100, respectively. It is recognized that although only two lines are depicted entering the central rotor-shaft chamber, a multiple number of lines may be employed as hereinafter described without departing from the practice of the present invention. The lateral transport lines direct the molten cosmetic masses to rotor transport lines 102 and 104 within shaft 56 to slip-shell 70 supported by brace 92 and support rod 62. The support rod is securely held within chamber 34 by wing-nut 105.

Split mold 64 is indicated generally as it may appear beneath stator securing lug 78 wherein the masses are heterogeneously combined and in position ready to receive the heterogeneously combined masses within receiving form 66.

The top view of central rotor-shaft chamber 34 is illustrated in FIG. 7. Heat ports 106 and 108 are provided for maintaining the temperature of the chamber at a level sufficient to prevent solidification of the processed masses within the chamber. Generally, a temperature in the range of about 180° F. to about 200° F. provided by a controlled electrical resistant heating unit, not shown, is employed to maintain the temperature substantially constant during the processing of cosmetic masses. Other known heating units may also be employed if desired such as induction heating or steam heating units.

FIG. 8, appearing as a cross-sectional view taken along section lines A—A of FIG. 7, illustrates in greater detail the internal construction of central rotor-shaft chamber 34. Centrally disposed through the central rotor-shaft chamber is channel 110 constructed to receive shaft 56. Cut-outs 112, 114 and 116 within channel 110 are included to provide convenient receptacles for O-ring gaskets, not shown, to prevent leakage and premature blending of the molten masses between shaft 56 and the walls of the surrounding channels. Ports 118 at the top of chamber 34 and 120 at the bottom thereof also provide convenient receptacles for suitable gaskets, not shown. Similar provisions are also available at entrances 122 and 124 of lateral supply lines 98 and 100, respectively. Chamber 34 is also provided with channel 126 having screw threads 128 disposed near one end thereof to receive wing-nut 105 for securing support rod 62 in place.

FIG. 9 indicates in greater detail rotor 56 having supply lines 102 and 104 therein.

FIG. 10 is a sectional view taken along lines B—B of FIG. 9 and indicates the construction of the rotor when it is desired to heterogeneously blend two differently colored masses. FIG. 11 represents a similar cross-section view taken along section lines B—B of FIG. 9 indicating as an embodiment of the present invention, inclusion of three supply lines 130, 132 and 134. FIG. 12 further indicates an embodiment of FIG. 10 taken in similar fashion as a cross-section along lines B—B of FIG. 9 illustrating a rotor wherein four distinctively different masses may be combined in heterogeneous association through lines 136, 138, 140 and 142, respectively, all of which are centrally disposed about the axis of rotation.

Describing the present operation with regard to preparation of lipstick, solid lipstick masses containing distinctively different colors are received in solid pieces which are conveniently added to tanks 10–12 where they are melted. After the lipstick masses have obtained uniform molten temperature and viscosity, the molten masses proceed to a wait-pour section wherein the temperature is maintained at about 185 to about 200° F. At this temperature, the molten masses proceed into central rotor-shaft chamber 34, where they are received and transported vertically in rotor 40 by gravity to the mixing head portion of the apparatus. Desirably, the rotor is maintained at speeds such as about 250 r.p.m. although any desirable speed may be employed depending upon the flow rate and degree of mixing required in the final product as well as the association of other elements wherein mixing is a dependent factor. The molten lipstick proceeds through filling and pouring head 58 and is received in molds 66. The molds proceed past the filling and pouring head at a suitable rate such as 28–38 feet per minute. This rate is sufficient for molds 66 to be filled without excess overflow of molten lipstick masses in the molds while continually producing a product having a marbleized pattern. The molds, after being filled, proceed on a refrigerated surface maintained at a temperature of about 32° F. to about 36° F. to solidify the molten lipstick at a very rapid rate. Thereafter, excess lipstick solidified about the top of the mold is scraped off by a suitable scraping means, not shown, after which the mold is opened and the lipsticks removed. The molds, after cleaning, may then be returned to the filling station and the process repeated. The lipsticks removed from the molds may be flamed, after they are inserted in receiving cartridges such as indicated cartridge 96 of FIG. 5, whereupon the lipsticks are packed and prepared for shipment.

As is apparent from the foregoing description, the principal of the present invention is based on a combination of several factors which are necessary to achieve the proper reproducibility of individual products having the required degree of mixing of two or more colored masses in achieving a marbleization effect with unique color heterogeneity on the exterior and interior parts of the product mass. The factors necessary for the proper degree of heterogeneity of two or more colors to achieve a marbleized product include the speed of rotor-shaft 56 in relation to stationary stator 82, and concurrent movement of molds 64 past the pouring point. The speed of the moving molds is important and affects the change in the horizontal and vertical pattern in the partially mixed materials received in molds 66. The degree of heterogeneity in the product is also dependent upon the nature of mixing bowl 84 of stator 82 as well as the rate of flow of the masses from port 88.

The masses processed by the present apparatus may be most any known lipstick composition and includes those containing additives such as medicaments, flavoring, perfumes and the like so long as the masses have essentially the same densities which are necessary in forming the final combination of colors as a marbleization blend of colors. Eye shadow compositions are also usefully processed by the present apparatus.

The compositions for use in base formulations to which colors may be added for processing by the present apparatus include any suitable base materials known to the art which contain materials such as carnauba wax, candelilla wax, ozokerite, bees wax, lanolin, ceresin, spermaceti, isopropyl myristate, and castor oil which when combined produce a suitable base formulation having suitable viscosity for molten combinations of the differently colored masses.

An example of a suitable lipstick base composition usefully employed herein is as follows:

| Composition | Weight percent |
|---|---|
| Castor oil | 65 |
| Candelilla wax | 7 |
| Lanolin | 10 |
| Carnauba wax | 3 |
| Ozokerite | 3 |
| Bees wax | 7 |
| Isopropyl myristate | 5 |

An example of a suitable eye shadow base composition usefully employed herein is the following:

| Composition | Weight percent |
|---|---|
| Ceresin wax, M.P. 67° C. | 31.0 |
| Hydrogenated cottonseed oil | 6.0 |
| Castor oil, U.S.P. | 51.0 |
| Carnauba wax | 4.0 |
| Mineral oil | 7.0 |
| Butylated hydroxy anisol | 0.1 |
| Cab-o-Sil [1] | 0.9 |

[1] Cab-o-Sil is a finely divided silicon dioxide by Godfrey L. Cabot, Inc., of Boston, Mass.

The coloring agents usefully employed in compositions processed by the present apparatus to provide proper coloring to the base formulations added to color tanks 10 and 12 include those well known to the art such as, for example, organic colors certified for use in drug and cosmetic products, pure inorganic colors, and pure colors of natural origin suitable for use in lipsticks and eye shadow preparations. These dyes and pigments include Food, Drug & Cosmetic certified colors and may be added in an amount from about 5 to about 20 parts by weight for each 100 parts by weight of cosmetic base. Flavoring such as synthetic aromatics, essential oils, or other similar material may also be included if desired.

Fortifying agents may be also usefully added to the cosmetic masses and include materials such as silica, alumina, calcium carbonate, magnesium carbonate, bentonites, talcs, zinc oxide, and the like. Various other agents may also be added to the masses to achieve proper molten viscosity such as addition of various oil-soluble resins, soluble metallic soaps, and viscous polymerized oils.

Additional material such as flavoring or perfumes are not necessary to or essential parts of the cosmetic masses processed by the present apparatus but may be included as desired in relatively small quantities.

The term "heterogeneously associated" as used herein means the intimate combination of distinctively different colored base compositions to form a mass having virtually complete color separation which may be easily perceived by the unaided, naked eye.

Although the principles of this invention are described to specific cosmetic preparations such as lipsticks and eye shadow preparations, other cosmetic products usefully processed herein include molded cosmetic sticks such as eye mascara, deodorant sticks or the like. It is also recognized that although the present apparatus is especially useful in processing cosmetic preparations, it may also be applied in processing non-cosmetic products such as ornamental candles, wax-based pencils, crayons and other drawing materials, and the like without departing from the present invention.

Finally, it is recognized that suitable heating means such as electrical resistant heating units may be individually provided for the several elements of the apparatus which processes or transports the cosmetic masses in the molten state in order to prevent premature solidifying of the masses in the system. Other suitable heating means known to the art may also be usefully employed.

It is understood that the foregoing detailed description is given merely by way of illustration and that many variations may be made without departing from the spirit of the invention, which is intended to be limited only by the appended claims.

What is claimed is:

1. In a method of preparing multi-colored unitary products by preparing a wax base formulation, adding a multiple number of coloring agents to multiple portions of the prepared base formulation, said multiple number of coloring agents each being distinctively different and distinguishable in color by the naked, unaided eye, melting the separate base formulations at a temperature of about 185° to about 200° F., with stirring to effect color distribution the improvement which comprises separately transporting said base formulations in molten form to corresponding channels within a rotating shaft, mixing said transported base formulations into a heterogeneous association of colors in a stationary chamber provided at one end of the rotating shaft, and thereafter cooling to 32° to 36° F. the heterogeneously combined molten color base formulation into a unitary solid product having substantially complete color separation between the combined portions of base formulation.

2. The method of claim 1 wherein the multiple number of coloring agents is two.

3. The method of claim 1 wherein the multiple number of coloring agents is three.

4. The method of claim 1 wherein the multiple number of coloring agents is four.

5. A method of preparing multi-colored unitary cosmetic products which comprises, preparing a cosmetic base formulation, adding a first coloring agent to a first portion and a second coloring agent to a second portion of the cosmetic base formulation, said first coloring agent being distinctively different and distinguishable in color by the naked, unaided eye from said second coloring agent, melting the separate cosmetic base formulations at a temperature of about 185° to about 200° F. with stirring to effect color distribution, separately transporting said cosmetic base formulations in molten form to corresponding channels within a rotating shaft, mixing said transported based formulations into a heterogeneous association of colors in a stationary chamber provided at one end of the rotating shaft, and thereafter cooling to 32° to 36° F. and forming the heterogeneously combined molten color base formulation into a unitary solid product having substantially complete color separation between the combined portions of base formulation.

References Cited

UNITED STATES PATENTS

| | | |
|---|---|---|
| 2,566,722 | 9/1951 | Friedberg. |
| 2,772,982 | 12/1956 | Vesce. |
| 3,086,914 | 4/1963 | Soloway. |
| 3,201,314 | 8/1965 | Morshauser et al. _ 167—905 XR |
| 3,228,662 | 1/1966 | Morshauser et al. _____ 259—7 |

LEON ZITVER, Primary Examiner

H. T. MARS, Assistant Examiner

U.S. Cl. X.R.

264—75; 424—64